(12) United States Patent
Zhu et al.

(10) Patent No.: US 12,158,641 B2
(45) Date of Patent: Dec. 3, 2024

(54) BACKLIGHT MODULE INCLUDING PRIVACY STRUCTURE WITH TRIANGULAR PRISM STRUCTURE AND DISPLAY APPARATUS INCLUDING THE SAME

(71) Applicants: Beijing BOE Optoelectronics Technology Co., Ltd., Beijing (CN); BOE Technology Group Co., Ltd., Beijing (CN)

(72) Inventors: Heling Zhu, Beijing (CN); Yue Zhai, Beijing (CN); Jian Sang, Beijing (CN); Rui Han, Beijing (CN); Dong Cui, Beijing (CN); Zhipeng Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/781,188

(22) PCT Filed: Apr. 21, 2021

(86) PCT No.: PCT/CN2021/088802
§ 371 (c)(1),
(2) Date: May 31, 2022

(87) PCT Pub. No.: WO2022/222083
PCT Pub. Date: Oct. 27, 2022

(65) Prior Publication Data
US 2024/0184150 A1    Jun. 6, 2024

(51) Int. Cl.
*G02F 1/13* (2006.01)
*F21V 8/00* (2006.01)
*G02F 1/1335* (2006.01)

(52) U.S. Cl.
CPC ......... *G02F 1/1323* (2013.01); *G02B 6/0036* (2013.01); *G02B 6/0053* (2013.01);
(Continued)

(58) Field of Classification Search
CPC ... G02B 6/0036; G02B 6/0038; G02F 1/1323; G02F 1/133626; G02F 1/133627
See application file for complete search history.

(56) References Cited

U.S. PATENT DOCUMENTS

2008/0002431 A1* 1/2008 Maeda ............... G02B 6/0038
                                                            362/618
2008/0112187 A1   5/2008 Katsumata et al.
(Continued)

FOREIGN PATENT DOCUMENTS

CN   101251674 A   8/2008
CN   102640039 A   8/2012
(Continued)

OTHER PUBLICATIONS

Extended European search report of counterpart European application No. 21937326.3 issued on Dec. 5, 2023.
(Continued)

*Primary Examiner* — Keith G. Delahoussaye
(74) *Attorney, Agent, or Firm* — Lippes Mathias LLP

(57) ABSTRACT

A backlight module, including: a surface light source; a first light guide plate laminated with the surface light source in a thickness direction, wherein the first light guide plate is on a light-exiting side of the surface light source, and a side of the first light guide plate proximal to the surface light source comprises a plurality of first networks; and a first light source on a side surface of the first light guide plate, in which an orthographic projection of the first light source onto a plane, where a light-exiting surface of the surface
(Continued)

light source is located, does not overlap with that of the first light guide plate onto the plane.

20 Claims, 9 Drawing Sheets

(52) U.S. Cl.
CPC ......... *G02B 6/0068* (2013.01); *G02B 6/0076* (2013.01); *G02F 1/133627* (2021.01); *G02B 6/0055* (2013.01); *G02B 6/0088* (2013.01); *G02F 1/133626* (2021.01)

(56) References Cited

U.S. PATENT DOCUMENTS

| | | |
|---|---|---|
| 2012/0235891 A1 | 9/2012 | Nishitani et al. |
| 2013/0033901 A1 | 2/2013 | Nishitani et al. |
| 2013/0222234 A1 | 8/2013 | Tanaka et al. |
| 2016/0349438 A1 | 12/2016 | Ma et al. |
| 2017/0131455 A1* | 5/2017 | Asano ................. G02B 6/0038 |
| 2017/0153383 A1 | 6/2017 | Lee et al. |
| 2017/0261672 A1 | 9/2017 | Liu et al. |
| 2017/0269283 A1 | 9/2017 | Wang et al. |
| 2017/0329073 A1 | 11/2017 | Liu et al. |
| 2018/0039016 A1 | 2/2018 | Wang et al. |
| 2018/0106950 A1 | 4/2018 | Kuo et al. |
| 2018/0292598 A1 | 10/2018 | Ke et al. |
| 2019/0113783 A1 | 4/2019 | Ji |
| 2019/0235150 A1 | 8/2019 | Hsu et al. |
| 2020/0124886 A1 | 4/2020 | Song et al. |
| 2020/0150331 A1 | 5/2020 | Tang et al. |
| 2021/0011212 A1 | 1/2021 | Hsu et al. |
| 2021/0191027 A1 | 6/2021 | Liao et al. |
| 2021/0325731 A1 | 10/2021 | Li et al. |

FOREIGN PATENT DOCUMENTS

| | | |
|---|---|---|
| CN | 102844608 A | 12/2012 |
| CN | 104880760 A | 9/2015 |
| CN | 105911746 A | 8/2016 |
| CN | 205880454 U | 1/2017 |
| CN | 206057756 U | 3/2017 |
| CN | 106814502 A | 6/2017 |
| CN | 107179627 A | 9/2017 |
| CN | 207301564 U | 5/2018 |
| CN | 108983447 A | 12/2018 |
| CN | 109541738 A | 3/2019 |
| CN | 111045256 A | 4/2020 |
| CN | 111176016 A | 5/2020 |
| CN | 111474747 A | 7/2020 |
| CN | 211180488 U | 8/2020 |
| CN | 211236517 U | 8/2020 |
| CN | 111694087 A | 9/2020 |
| CN | 111856819 A | 10/2020 |
| CN | 112213883 A | 1/2021 |
| CN | 212341509 U | 1/2021 |
| EP | 3244256 A1 | 11/2017 |
| JP | 2018085267 A | 5/2018 |
| TW | 201734602 A | 10/2017 |
| TW | 201740169 A | 11/2017 |
| TW | I658294 B | 5/2019 |
| WO | 2017065745 A1 | 4/2017 |

OTHER PUBLICATIONS

China National Intellectual Property Administration, First office action of Chinese application No. 202180000845.9 issued on Apr. 24, 2024.

* cited by examiner

BACKLIGHT MODULE INCLUDING PRIVACY STRUCTURE WITH TRIANGULAR PRISM STRUCTURE AND DISPLAY APPARATUS INCLUDING THE SAME

CROSS-REFERENCE TO RELATED APPLICATION

This application is a 371 of PCT application No. PCT/CN2021/088802, filed on Apr. 21, 2021, the disclosure of which is incorporated herein by reference in its entirety.

TECHNICAL FIELD

The present disclosure relates to the field of display technologies, and in particular relates to a backlight module and a display apparatus.

BACKGROUND

With the development of display technologies, display apparatuses need to have different viewing angles on different occasions. For example, when multiple people need to see a display picture of a display apparatus from different angles, a viewing angle of the display apparatus needs to be large so that the display apparatus is in the sharing mode. When the content of the display picture needs to be kept confidential and only visible to the user himself/herself, a range of the viewing angle of the display apparatus needs to be small, so that the display apparatus is in the privacy mode.

In the related art, when the display apparatus is in the sharing mode, if an angle between a viewing direction of a human eye and a normal line of a display surface of the display apparatus is small, the observed display picture is lighter; and if the angle between the viewing direction of the human eye and the normal line of the display surface of the display apparatus is large, the observed display picture is darker. In this way, when the display apparatus is in the sharing mode, the display effect of the display apparatus is poor.

SUMMARY

Embodiments of the present disclosure provide a backlight module and a display apparatus, which can solve the problem in the prior art that when the display apparatus is in the sharing mode, the display effect of the display apparatus is poor. The technical solutions of the present disclosure are as follows.

In one aspect, a backlight module is provided. The backlight module includes:
 a surface light source;
 a first light guide plate laminated with the surface light source in a thickness direction, wherein the first light guide plate is on a light-exiting side of the surface light source, and a side of the first light guide plate proximal to the surface light source includes a plurality of first networks; and
 a first light source on a side surface of the first light guide plate, wherein an orthographic projection of the first light source onto a plane, where a light-exiting surface of the surface light source is located, does not overlap with that of the first light guide plate onto the plane.
 Optionally, the first light source is a strip-shaped light source;
 the first network is of a prism structure, and a length direction of the first network is parallel to an extending direction of a light source strip of the first light source; and
 the first network is of a triangular prism structure; the first network includes a first side surface in contact with the first light guide plate, and a second side surface and a third side surface which are connected to the first side surface; a first angle exists between the first side surface and the second side surface; a second angle exists between the first side surface and the third side surface; and a third angle exists between the second side surface and the third side surface.

Optionally, the width of the first side surface in the length direction of the first network ranges from 35 µm to 100 µm, and the width of the first side surface in a direction perpendicular to the length direction of the first network ranges from 20 µm to 100 µm.

Optionally, the first angle ranges from 20° to 70°, and the second angle is less than or equal to 20°.

Optionally, a chamfer exists at the third angle, and the chamfer is a circular arc with a radius less than or equal to 30 µm.

Optionally, the surface light source is a collimation surface light source.

Optionally, the collimation surface light source includes a privacy structure and a second light guide plate that are laminated in the thickness direction;
 the second light guide plate is on a side of the privacy structure distal from the first light guide plate, and a side of the second light guide plate distal from the privacy structure includes a plurality of second networks; and
 the collimation surface light source further includes a second light source on a side surface of the second light guide plate, and an orthographic projection of the second light source onto a plane, where a light-exiting surface of the collimation surface light source is located, does not overlap with that of the second light guide plate onto the plane.

Optionally, the privacy structure includes a first substrate, and a plurality of strip-shaped first prisms on the first substrate, and the plurality of first prisms are on a side of the first substrate proximal to the second light guide plate.

Optionally, the second light source is a strip-shaped light source, and an extending direction of a light source strip of the second light source is the same as that of the light source strip of the first light source; and
 length directions of the plurality of first prisms are parallel to the extending direction of the light source strip of the second light source.

Optionally, the first prism is of a triangular prism structure, and has a fourth side surface in contact with the first substrate, and a fifth side surface and a sixth side surface which are connected to the fourth side surface; and
 a fourth angle between the fourth side surface and the fifth side surface is greater than or equal to a fifth angle between the fourth side surface and the sixth side surface, and the fourth side surface of the first prism is closer to the second light source than the fifth side surface.

Optionally, the fourth angle ranges from 45° to 90°, and the fifth angle ranges from 45° to 70°.

Optionally, the fourth angle ranges from 60° to 72°, and the fifth angle ranges from 53° to 57°.

Optionally, a chamfer exists at a sixth angle between the fifth side surface and the sixth side surface, and the chamfer is a circular arc with a radius less than or equal to 30 µm.

Optionally, the privacy structure further includes a particle diffusion layer, and the particle diffusion layer includes a transparent film layer and a plurality of particles in the transparent film layer; and the transparent film layer is the first substrate, or the transparent film layer is a film layer on a side of the first substrate distal from the plurality of first prisms.

Optionally, the concentration of the particles in the transparent film layer ranges from 10% to 90%.

Optionally, the second network is of a triangular prism structure, and a length direction of the second network is parallel to the extending direction of the light source strip of the second light source;

the second network includes a seventh side surface in contact with the second light guide plate, and an eighth side surface and a ninth side surface which are connected to the seventh side surface; and a seventh angle exists between the seventh side surface and the eighth side surface, an eighth angle exists between the seventh side surface and the ninth side surface, and a ninth angle exists between the eighth side surface and the ninth side surface.

Optionally, the width of the seventh side surface in the length direction of the second network ranges from 35 µm to 100 µm, and the width of the seventh side surface in a direction perpendicular to the length direction of the second network ranges from 20 µm to 100 µm.

Optionally, the seventh angle is greater than the eighth angle, and the eighth side surface of the second network is closer to the second light source than the ninth side surface.

Optionally, the seventh angle ranges from 10° to 90°, and the eighth angle is less than or equal to 30°.

Optionally, the seventh angle ranges from 26° to 30°, and the eighth angle is less than or equal to 5°.

Optionally, a chamfer exists at the ninth angle between the eighth side surface and the ninth side surface, and the chamfer is a circular arc with a radius less than or equal to 30 µm.

Optionally, the radius of the circular arc is less than or equal to 5 µm.

Optionally, the first network and the second network are of the same shape and size.

Optionally, the privacy structure includes a grating structure.

Optionally, the collimation surface light source further includes a reflector on a side of the second light guide plate distal from the privacy structure.

Optionally, the collimation surface light source further includes a second substrate disposed between the second light guide plate and the reflector, and a plurality of strip-shaped second prisms on the second substrate, the second prisms are on a side of the second substrate proximal to the second light guide plate, and length directions of the plurality of second prisms are perpendicular to the extending direction of the light source strip of the second light source.

Optionally, a side of the first light guide plate distal from the plurality of first networks includes a plurality of strip-shaped third prisms, and/or a side of the second light guide plate distal from the plurality of second networks includes a plurality of strip-shaped fourth prisms, and length directions of the plurality of third prisms and length directions of the plurality of fourth prisms are perpendicular to the extending direction of the light source strip of the second light source.

Optionally, the backlight module further includes a frame, and the first light guide plate, the second light guide plate, the privacy structure, the first light source and the second light source are all in the frame.

Optionally, the frame includes a back plate, the back plate includes a first groove, a second groove and a third groove that are sequentially communicated, an opening surface of the first groove is coplanar with a bottom surface of the second groove, and an opening surface of the second groove is coplanar with a bottom surface of the third groove; and the reflector is in the first groove, both of the second light guide plate and the second light source are in the second groove, and both of the first light guide plate and the first light source are in the third groove.

Optionally, the frame further includes a plastic frame connected to an edge of the back plate, and the plastic frame has a panel bearing portion configured to bear a display panel.

Optionally, the first light source and the second light source are on the same side of the frame, or the first light source and the second light source are on two opposite sides of the frame respectively.

In another aspect, a display apparatus is provided. The display apparatus includes:

a display panel, and the backlight module described above.

The technical solutions provided by the embodiments of the present disclosure has at least the following beneficial effects.

The backlight module includes: the surface light source, the first light guide plate and the first light source. In the backlight module, since the first light guide plate is on the light-exiting side of the surface light source, light emitted by the first light source may exit from the backlight module only after being reflected by the first network, without passing through other film layers. Therefore, loss of the light emitted by the first light source is reduced in the transmitting process, and the light brightness in an auxiliary viewing angle area is improved when the backlight module is in a sharing mode. Further, when the display apparatus including the backlight module is in the sharing mode, the brightness of a display picture and the display effect of the display apparatus are improved.

BRIEF DESCRIPTION OF THE DRAWINGS

For clearer descriptions of the technical solutions in the embodiments of the present disclosure, the following briefly introduces the accompanying drawings required for describing the embodiments or the prior art. Apparently, the accompanying drawings in the following description show merely some embodiments of the present disclosure, and those of ordinary skill in the art may still derive other drawings from these accompanying drawings without creative efforts.

DETAILED DESCRIPTION

To make objectives, technical solutions and advantages of the present disclosure clearer, the embodiments of the present disclosure will be described in detail below with reference to the accompanying drawings.

Currently, vehicle-mounted display products mainly include an instrument cluster display (ICD) system and a central information display (CID) system which are disposed in front of a driver, as well as a co-driver display (CDD) system disposed in front of a co-driver. The ICD system and the CID system are mainly used by the driver for operation and viewing, while the CDD system can display the image containing entertainment information and the picture containing navigation information.

In a usage scenario in demand, for example, when the co-driver assists the driver in navigation, information displayed by the CDD system needs to have a wide viewing angle, such that people in a vehicle can see the display picture. This display mode is defined as a first sharing mode.

In another usage scenario in demand, for example, when the driver's navigation image is not expected to disturb the co-driver, the information that needs to be displayed by the CDD system is only displayed in the driver's viewing angle direction, but not obviously visible in other visual angle directions. This display mode is defined as a first privacy mode.

In yet another usage scenario in demand, for example, when images displayed by the CDD system contain a picture of entertainment information, in order to avoid interfering with the driver, it is necessary to start a privacy mode of the CDD system, i.e., the co-driver is only expected to see the picture displayed on the CDD system, and the picture is not obviously visible in the driver's viewing angle direction. This display mode is defined as a second privacy mode.

In still another usage scenario in demand, for example, when the CDD system displays the picture containing navigation information, it is necessary to start a sharing mode of the CDD system, i.e., the driver and the co-driver can simultaneously view the picture displayed on the CDD, and the picture is not obviously visible in other viewing angle directions. This display mode is defined as a second sharing mode.

When an angle between an observer's viewing direction and a normal line of a display surface is small (e.g., the angle ranges from 0° to ±20°), it is believed that the observer views the display picture in a main viewing angle area; and when the angle between the observer's viewing direction and the normal line of the display surface is large (e.g., the angle ranges from ±45° to ±60°), it is believed that the observer views the display picture in an auxiliary viewing angle area. Therefore, for the CDD system, the co-driver views the display picture of the CDD system in the main viewing angle area, while the driver views the display picture of the CDD system in the auxiliary viewing angle area.

Figure 1:
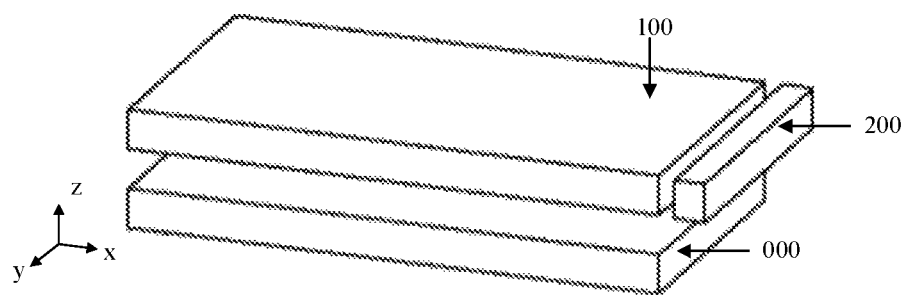
FIG. 1 is an exploded diagram of a backlight module according to an embodiment of the present disclosure.
Figure 2:
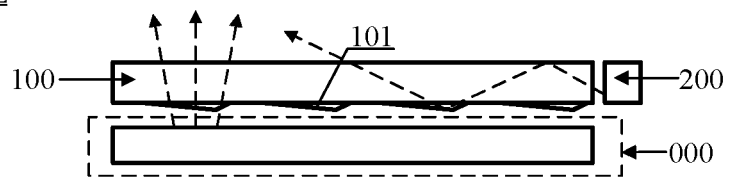
FIG. 2 is a schematic structural diagram of the backlight module of FIG. 1 in an X-Z plane.

Reference is made to FIG. 1 and FIG. 2, in which FIG. 1 is an exploded diagram of a backlight module according to an embodiment of the present disclosure, and FIG. 2 is a schematic structural diagram of the backlight module of FIG. 1 in an X-Z plane. The backlight module may include a surface light source 000, a first light guide plate 100 and a first light source 200.

The first light guide plate 100 and the surface light source 000 are laminated in a thickness direction, and the first light guide plate 100 is on a light-exiting side of the surface light source 000.

The first light source 200 is on a side surface of the first light guide plate 100, and an orthographic projection of the first light source 200 onto a plane, where a light-exiting surface of the surface light source 000 is located, does not overlap with that of the first light guide plate 100 onto the plane.

A thickness direction of the backlight module is a Z direction, and the light-exiting surface of the surface light source 000 is a plane, i.e., an X-Y plane, perpendicular to the thickness direction.

Optionally, the surface light source 000 is a direct-type backlight (e.g., a Mini-LED backlight) surface light source, or the surface light source 000 is a side-type backlight surface light source.

Exemplarily, reference is made to FIG. 2, which is a light path diagram when the surface light source 000 and/or the first light source 200 are/is turned on. The surface light source 000 may emit light when turned on, and when the surface light source 000 has a light-emitting angle within a wide range (e.g., an angle between a maximum light-exiting angle and a normal direction of a display surface is less than 90° and greater than −90°; e.g., the angle is ±89°, ±80° or ±60°), all people in a vehicle can see the display picture, and at this time, the backlight module is in a first sharing mode. When the first light source 200 is turned on and the surface light source 000 is turned off, light emitted by the backlight module is concentrated in an auxiliary viewing angle area, and the backlight module is in a large viewing angle mode. In this case, the light brightness in a main viewing angle area is low, while the light brightness in the auxiliary viewing angle area is high. When the backlight module is integrated in a display apparatus, the display picture of the display apparatus may be observed in the auxiliary viewing angle area, and it is difficult to observe the display picture of the display apparatus in the main viewing angle area, or the display picture of the display apparatus is not obviously visible in the main viewing angle area. At this time, the backlight module is in a first privacy mode. It can be understood that when the surface light source 000 and the first light source 200 are turned on, the backlight module is in the first sharing mode, and the light brightness in the auxiliary viewing angle area can be further enhanced.

Exemplarily, continuously referring to FIG. 2, the surface light source 000 may be a collimation surface light source. As a collimation surface light source, the surface light source 000 has a narrow light-emitting angle (e.g., the angle between the maximum light-exiting angle and the normal direction of the display surface is ±30°; e.g., the angle is ±20° or ±15°). When the first light source 200 is turned off and the collimation surface light source 000 is turned on, the light brightness in the main viewing angle area is high, and the light brightness in the auxiliary viewing angle area is low. When the backlight module is integrated in the display apparatus, the display picture of the display apparatus may be observed in the main viewing angle area, and it is difficult to observe the display picture of the display apparatus in the auxiliary viewing angle area, or the display picture of the display apparatus is not obviously visible in the auxiliary viewing angle area. At this time, the backlight module is in a second privacy mode. When the first light source 200 and the collimation surface light source 000 are turned on, the pictures displayed on the CDD system may be viewed in both a main viewing angle area and an auxiliary viewing angle area. However, since the surface light source 000 is a collimation surface light source, when the backlight module is integrated in the display apparatus, it is difficult to observe the display picture of the display apparatus in other viewing angle areas except the main viewing angle area and the auxiliary viewing angle area, or the display picture of the display apparatus is not obviously visible in other viewing angle areas. At this time, the backlight module is in a second sharing mode. It can be understood that when the first light source 200 is turned on and the collimation surface light source 000 is turned off, the backlight module is in the first privacy mode.

In summary, the backlight module provided by the embodiment of the present disclosure includes the surface light source, the first light guide plate and the first light source. In the backlight module, since the first light guide plate is on the light-exiting side of the surface light source, light emitted by the first light source may exit from the backlight module only after being reflected by a first network, without passing through other film layers. Therefore, loss of the light emitted by the first light source is reduced in the transmitting process, and the light brightness in the auxiliary viewing angle area is improved when the backlight module is in a sharing mode. Further, when the display apparatus including the backlight module is in the sharing mode, the brightness of a display picture and the display effect of the display apparatus are improved.

In some specific embodiments, referring to FIGS. 1 and 2, the first light source 200 is a strip-shaped light source; and a first network 101 is of a prism structure, and a length direction of the first network 101 is parallel to an extending direction of a light source strip of the first light source 000. The first network 101 is configured to break a total reflection of emergent light of the first light source 200 in the first light guide plate 100, such that light may exit from the auxiliary viewing angle.

More specifically, the first light source 200 may be a light-emitting diode (LED) light bar. The first light source 200 may include a plurality of LED units 200a arranged in a column or array. The strip-shaped light source means that an overall shape formed by all the LED units of the first light source 200 are strip-shaped. For example, the first light source 200 may be a rectangular array composed of m×n LED units, with m columns and n rows of LED units, where m<n; the first light source 200 may be designed as m columns of LED units distributed in a thickness direction of the first light guide plate 100, and n rows of LED units distributed in an extending direction of the strip-shaped light source. It should be noted that a reference number of the LED units 200a is not marked in FIG. 2, but marked in the following FIG. 25. It can be understood that the strip-shaped light source may also be a continuous light source, such as a surface light source or a line light source that emits light uniformly.

Figure 3:
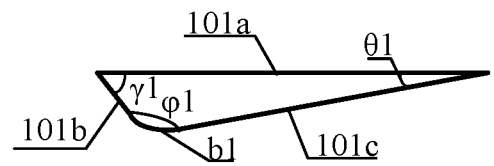
FIG. 3 is a front view of a first network in the backlight module of FIG. 2 in an X-Z plane.
Figure 4:
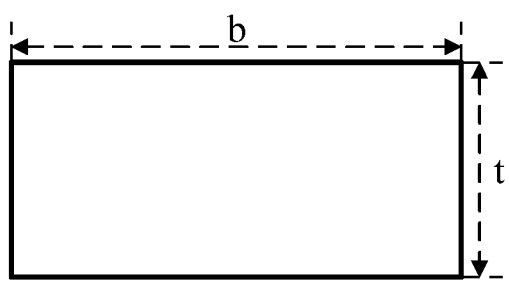
FIG. 4 is a top view of the first network of FIG. 2 in an X-Y plane.

Preferably, referring to FIGS. 1 to 4, in which FIG. 3 is a front view of a first network in the backlight module of FIG. 2 in an X-Z plane, and FIG. 4 is a top view of the first network of FIG. 2 in an X-Y plane. The first network 101 is of a triangular prism structure and has a first side surface 101a in contact with the first light guide plate 100, and a second side surface 101b and a third side surface 101c which are connected to the first side surface 100. There is a first angle θ1 between the first side surface 101a and the third side surface 101c, a second angle γ1 between the first side surface 101a and the second side surface 101b, and a third angle φ1 between the second side surface 101b and the third side surface 101c.

Preferably, the first side surface 101a is rectangular. A width of the first side surface 101a in a length direction (i.e., a Y direction) of the first network 101 is t, and a width of the first side surface 101a in a direction (i.e., an X direction) perpendicular to the length direction of the first network 101 is b. In some optional embodiments, the width t of the first side surface 101a may range from 35 μm to 100 μm, and the width b of the first side surface 101a may range from 20 μm to 100 μm. When the width t of the first side surface 101a may range from 35 μm to 100 μm, and the width b of the first side surface 101a may range from 20 μm to 100 μm, such that light may exit in an auxiliary viewing angle direction and the network is not obviously visible.

Exemplarily, the width t of the first side surface 101a may be one of 35 μm, 45 μm, 50 μm, 55 μm, 60 μm, 65 μm, 75 μm, 80 μm, 90 μm and 100 μm, and an error range of the width t of the first side surface 101a is ±0.01 μm; and the width b of the first side surface 101a may be one of 25 μm, 35 μm, 40 μm, 41.7 μm, 45 μm, 45.5 μm, 50 μm, 51.7 μm, 56.3 μm, 53.5 μm, 55 μm and 65 μm, and an error range of the width b of the first side surface 101a is +0.02 μm.

In some optional embodiments, the first angle θ1 may range from 20° to 70°, and the second angle γ1 may range from 2° to 20°. When the first angle θ1 and the second angle γ1 are valued within the above ranges, light emitted by the first light source 200 may exit in the auxiliary viewing angle area and is not obviously visible within a main viewing angle range, such that the backlight module may achieve the display effect as expected. Preferably, the first angle θ1 may range from 20° to 65°, and the second angle γ1 may range from 2° to 15°.

In some optional embodiments, the first network 101 may also be of a rectangular pyramid structure.

In some optional embodiments, the first side surface 101a may be of other shapes expect a rectangle. In this case, a maximum width t0 of the first side surface 101a in the length direction (i.e., the Y direction) of the first network 101 is defined as the width of the first side surface 101a in the length direction of the first network 101. Optionally, t0 ranges from 35 μm to 100 μm. A maximum width b0 of the first side surface 101a in a direction perpendicular to the length direction of the first network 101 is defined as the width of the first side surface 101a in the direction perpendicular to the length direction of the first network 101. Optionally, b0 ranges from 20 μm to 100 μm.

In some optional embodiments, referring to FIG. 3, the third angle φ1 may further include a chamfer b1. In some embodiments, the chamfer b1 is a circular arc. Optionally, the radius of the circular arc is less than or equal to 30 μm, such that the backlight module has a better display effect. Moreover, the smaller the radius of the circular arc is, the more accurate control of the viewing angle of the backlight module may be achieved. Therefore, preferably, the radius of the circular arc is less than or equal to 10 μm; further preferably, the radius of the circular arc is less than or equal to 5 μm; and even more preferably, the radius of the circular arc is less than or equal to 3 μm.

Figure 5:
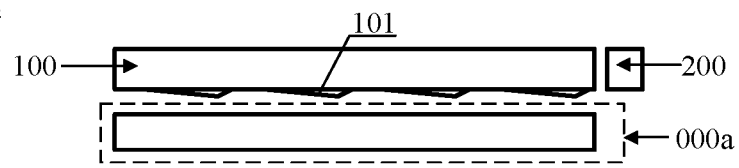
FIG. 5 is another schematic structural diagram of the backlight module of FIG. 1 in an X-Z plane.

In order to realize the second privacy mode and the second sharing mode, the surface light source may be a collimation surface light source. Reference is made to FIG. 5, which is another schematic structural diagram of the backlight module of FIG. 1 in an X-Z plane, the collimation surface light source 000a and the first light guide plate 100 are laminated in a thickness direction of the collimation surface light source 000a. The form of the collimation surface light source 000a is not specifically limited in the present disclosure as long as the light-exiting angle of the light-exiting surface of the collimation surface light source 000a is narrow. For example, when intensity of light emitted by the collimation surface light source 000a is decreased to 5% of a maximum light intensity with changes of the angle, an angle between a light-exiting angle and a direction, in which intensity of light emitted by the collimation surface light source 000a is maximal, is not more than 30°, 20° or 15°. The direction, in which the intensity of light emitted by the collimation surface light source 000a is maximal, is not limited in the present disclosure; and the direction, in which the intensity of light emitted by the collimation surface light source 000a is maximal, may be defined as an angle between the direction, in which the intensity of light emitted by the collimation surface light source 000a is maximal, and the normal direction. For example, the direction, in which the intensity of light emitted by the collimation surface light source 000a is maximal, may be the same as the normal direction of the display surface; and for example, there may be a certain angle between the direction, in which the intensity of light emitted by the collimation surface light source 000a is maximal, and the normal direction of the light-exiting surface of the collimation surface light source 000a, e.g., the angle falls within the range of 5°, 10° or 20°.

Figure 6:
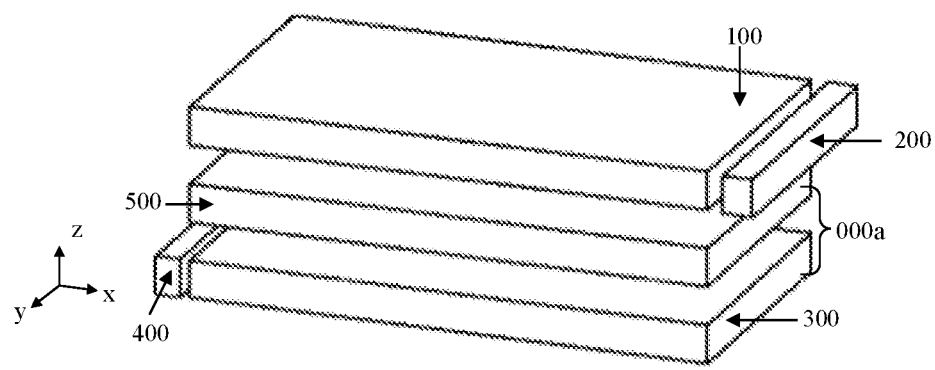
FIG. 6 is an exploded diagram of another backlight module according to an embodiment of the present disclosure.
Figure 7:
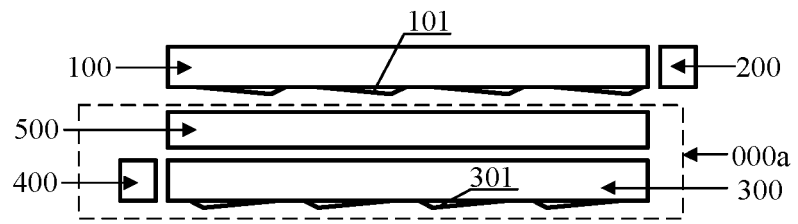
FIG. 7 is a schematic structural diagram of the backlight module of FIG. 6 in an X-Z plane.

In some optional embodiments, referring to FIGS. 6 and 7, in which FIG. 6 is an exploded diagram of another backlight module according to an embodiment of the present disclosure, and FIG. 7 is a schematic structural diagram of the backlight module of FIG. 6 in an X-Z plane. The collimation surface light source 000a includes a privacy structure 500 and a second light guide plate 300 which are laminated in a thickness direction; the second light guide plate 300 is on a side of the privacy structure 500 distal from the first light guide plate 100, and a side of the second light guide plate 300 distal from the privacy structure 500 includes a plurality of second networks 301.

The collimation surface light source 000a further includes a second light source 400 on a side surface of the second light guide plate 300, and an orthographic projection of the second light source 400 onto a plane, where a light-exiting surface of the collimation surface light source 000a is located, does not overlap with that of the second light guide plate 300 onto the plane.

Figure 8:
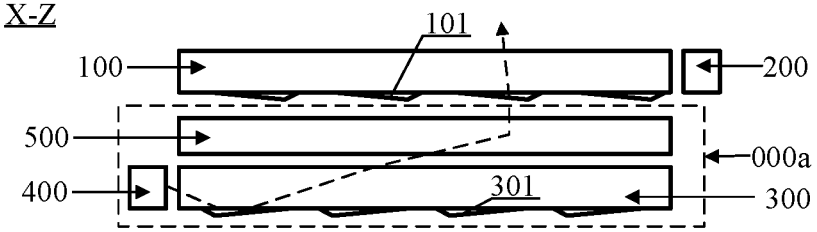
FIG. 8 is a light path diagram of the backlight module of FIG. 6 and FIG. 7 in a second privacy mode.

Exemplarily, referring to FIG. 8, which is a light path diagram of the backlight module of FIGS. 6 and 7 in a second privacy mode, when the collimation surface light source 000a is turned on and the first light source 200 is turned off, the collimation surface light source 000a may emit collimating light to cause the backlight module to be in the second privacy mode.

Figure 9:
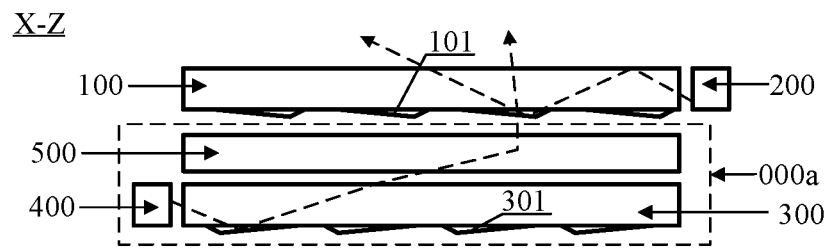
FIG. 9 is a light path diagram of the backlight module of FIG. 6 and FIG. 7 in a second sharing mode.

Referring to FIG. 9, which is a light path diagram of the backlight module of FIGS. 6 and 7 in a second sharing mode, when the first light source 200 and the collimation surface light source 000a are turned on, light emitted by the first light source 200 may exit after being reflected by a plurality of first networks 101. The collimation surface light source 000a may emit collimating light to cause the backlight module to be in the second sharing mode.

Figure 10:
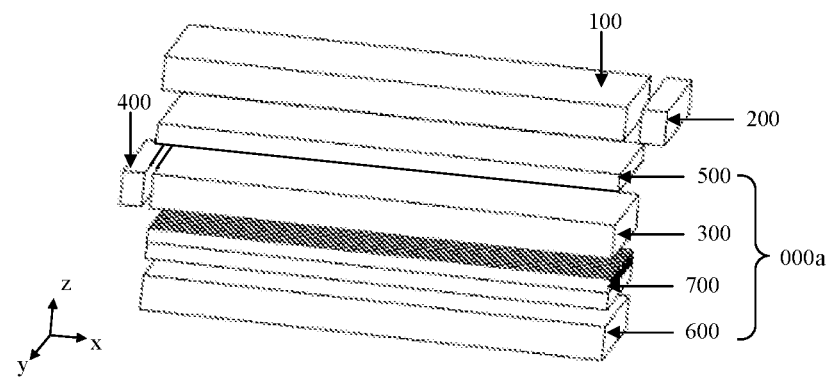
FIG. 10 is an exploded diagram of yet another backlight module according to an embodiment of the present disclosure.
Figure 11:
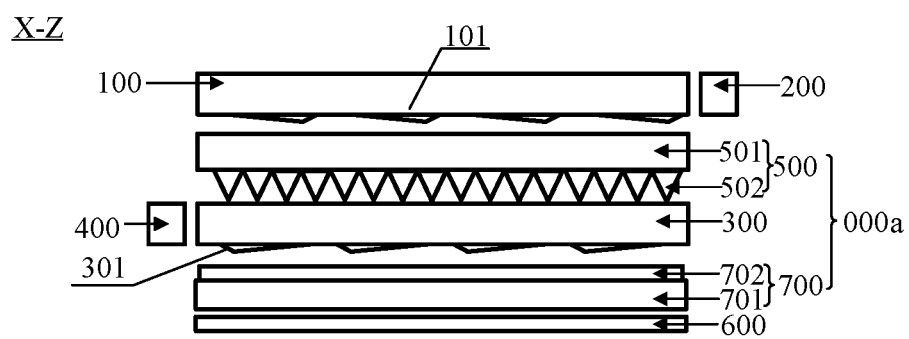
FIG. 11 is a schematic structural diagram of the backlight module of FIG. 10 in an X-Z plane.

In an embodiment of the present disclosure, referring to FIGS. 10 and 11, in which FIG. 10 is an exploded diagram of yet another backlight module according to an embodiment of the present disclosure, and FIG. 11 is a schematic structural diagram of the backlight module of FIG. 10 in an X-Z plane. In the backlight module, the collimation surface light source 000a may include a privacy structure 500 and a second light guide plate 300 which are laminated in a thickness direction. The second light guide plate 300 is on a side of the privacy structure 500 distal from the first light guide plate 100, and a side of the second light guide plate 300 distal from the privacy structure 500 includes a plurality of second networks 301. The collimation surface light source 000 may further include a second light source 400. The second light source 400 is on a side surface of the second light guide plate 300, and an orthographic projection of the second light source 400 onto a plane, where a light-exiting surface of the collimation surface light source 000a is located, does not overlap with that of the second light guide plate 300 onto the plane. Thus, light emitted by the second light source 400 may be reflected to the privacy structure 500 by the plurality of second networks 301 and converted into collimating light by the privacy structure 500, and the collimating light exits from the first light guide plate 100.

Optionally, the second light source 400 is a strip-shaped light source. Specifically, the second light source 400 may be an LED light bar. The second light source 400 may include a plurality of LED units 400a disposed in a column or array. Similar to the definition that the first light source is a strip-shaped light source, the strip-shaped light source means that an overall shape composed by all the LED units in the second light source 400 is strip-shaped. For example, the second light source 400 may be a rectangular array composed of p×q LED units, with p columns and q rows of LED units, wherein p<q. The second light source 400 may be designed as p columns of LED units distributed in a thickness direction of the first light guide plate 100, and Q rows of LED units distributed in an extending direction of the strip-shaped light source. It should be noted that reference number of the LED units 400a is not marked in FIG. 11, but marked in the following FIG. 25. It can be understood that the strip-shaped light source may also be a continuous light source, such as a surface light source or a line light source that emits light uniformly.

Optionally, the first light source 200 and the second light source 400 are completely the same.

In an embodiment of the present disclosure, the privacy structure 500 may be implemented in various ways, and in the present embodiment, a schematic explanation is made by taking the following two possible implementations as examples.

In the first possible implementation mode, the privacy structure 500 includes a grating structure (not shown in the figure). In this case, the second network 301 may be a circular network, and may break a total reflection of the light emitted by the second light source 400 in the second light guide plate 300, such that the light emitted by the second light source 400 is reflected to the grating structure by the second network 301. The grating structure may shield part of the light exiting from the second light guide plate 300, such that the light exiting from the second light guide plate 300 may be converted into collimating light, and a viewing angle range of the backlight module may be reduced to achieve a privacy function.

In the second possible implementation mode, referring to FIG. 11, the privacy structure 500 in the backlight module may include a first substrate 501 and a plurality of strip-shaped first prisms 502 on the first substrate 501, the plurality of first prisms is on a side of the first substrate 501 proximal to the second light guide plate 300 and may be in a close arrangement on the first substrate 501. The close arrangement means that there is no gap between any two adjacent first prisms.

Preferably, length directions of the plurality of first prisms 502 are parallel to an extending direction (i.e., a Y direction) of the light source strip of the second light source 400, and are perpendicular to the X-Z plane. In this way, the first prisms 502 may narrow the light exiting from the second light guide plate 300 in a horizontal direction of the light-exiting surface (i.e., the X-Y plane) of the backlight module and in a direction (i.e., the X direction) perpendicular to the extending direction of the light source strip of the second light source 400, such that the backlight module may achieve the privacy effect in the horizontal direction of its light-exiting surface. It should be noted that in the present disclosure, the direction perpendicular to the extending direction of the light source strip of the second light source 400 and parallel to the light-exiting surface of the backlight module may be defined as the horizontal direction (i.e., the X direction) of the light-exiting surface of the backlight module, while a direction parallel to the extending direction of the light source strip of the second light source 400 and the light-exiting surface of the backlight module may be defined as a vertical direction (i.e., the Y direction) of the light-exiting surface of the backlight module.

Figure 12:
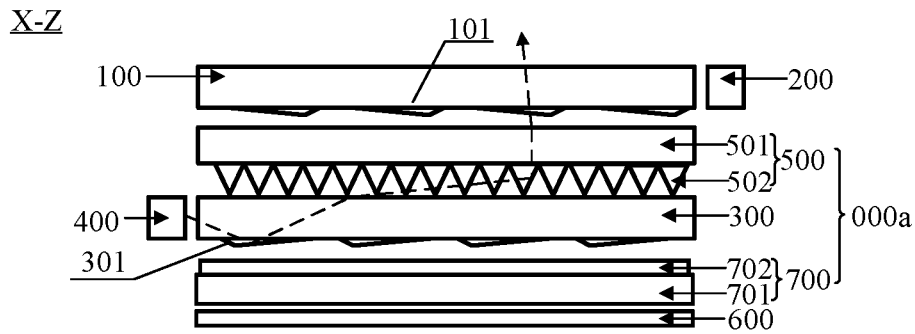
FIG. 12 is a light path diagram of the backlight module of FIG. 11 in a second privacy mode.

Exemplarily, referring to FIG. 12, which is a light path diagram of the backlight module of FIG. 11 in a second privacy mode, when the second light source 400 is turned on and the first light source 200 is turned off, light emitted by the second light source 400 is reflected by a plurality of second networks 301, exits from a side of the second light guide plate 300 distal from the second networks 301 and is incident onto the privacy structure 500. The first prism 502 in the privacy structure 500 may narrow the light exiting from the second light guide plate 300, such that the light exiting from the second light guide plate 300 is concentrated in the main viewing angle area, and the viewing angle range of the backlight module is narrowed, so as to realize the second privacy mode of the backlight module.

Optionally, the first substrate 501 is made from a non-opaque material, which may specifically include a transparent polymer material. Preferably, the material of the first substrate 501 may be polyethylene terephthalate (PET) with a refractive index ranging from 1.62 to 1.65, and the thickness of the first substrate 100 may range from 40 μm to 160 μm, for example, the thickness may be 50 μm, 75 μm, 100 μm, 125 μm or 150 μm, preferably 125 μm. The material of the first prism 502 is a non-opaque material, which may specifically include a transparent polymer material. Preferably, the first prism 502 may be made from polycarbonate (PC), PET or a light-curing material. The thickness of the first prism 502 may range from 25 μm to 50 μm, e.g., the thickness of the first prism 502 may preferably be 30 μm. When the material of the first prism 502 is PC or PET, the first prism 502 may be manufactured by means of hot pressing molding, and the refractive index of PC ranges from 1.58 to 1.59. Preferably, the first prism 502 is made from a light-curing material. When the material of the first prism 502 is the light-curing material, the first prism 502 may be cured under ultraviolet (UV) light irradiation, and the cured light-curing material has scratch resistance to reduce the probability that the surface of the first prism 502 is scratched by other structures. Specifically, the refractive index of the light-curing material ranges from 1.5 to 1.57.

Figure 13:
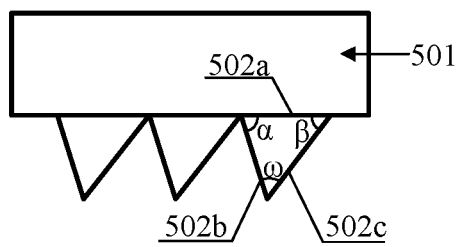
FIG. 13 is a partial enlarged diagram of a privacy structure in the backlight module of FIG. 11.

In some specific embodiments, referring to FIG. 13, which is a partial enlarged diagram of a privacy structure in the backlight module of FIG. 11. The first prism 502 is of a triangular prism structure, and has a fourth side surface 502a in contact with the first substrate 501, and a fifth side surface 502b and a sixth side surface 502c which are connected to the fourth side surface 502a. A fourth angle α between the fourth side surface 502a and the fifth side surface 502b is greater than or equal to a fifth angle β between the fourth side surface 502a and the sixth side surface 502c, and the fifth side surface 502b in the first prism 502 is closer to the second light source 400 than the sixth side surface 502c. In this way, the light exiting from the second light guide plate 300 is refracted at the fifth side surface 502b and totally reflected at the sixth side surface 502c of the first prism 502, such that the light exiting from the second light guide plate 300 is concentrated in the main viewing angle area. Therefore, the backlight module has a better privacy effect.

Optionally, the fourth angle α ranges from 45° to 90°, or from 50° to 85°, or from 60° to 72°. The fifth angle β ranges from 45° to 70°, or from 50° to 65°, or from 55° to 60°, or from 53° to 57°. Preferably, the fourth angle α may be one of 65.5°, 69°, 70° and 71°, and an error range of the fourth angle α is ±1°. The fifth angle β may be one of 54°, 55° and 56°, and an error range of the fifth angle β is ±1°. Therefore, when the backlight module is in the sharing mode, the light brightness in the auxiliary viewing angle area of the backlight module is high, and the light exiting from the second light guide plate 300 is high in collimation degree after being refracted by the first prism 502, such that the light exiting from the second light guide plate 300 is concentrated in the main viewing angle area, which guarantees an excellent privacy effect of the backlight module. In some embodiments, the fourth angle α may equal the fifth angle β, which can reduce the process complexity and the cost in manufacturing the privacy structure 500. For example, both of the fourth angle α and the fifth angle β may range from 53° to 57°. For example, both of the fourth angle α and the fifth angle β may be 54°, 55° or 56°.

Figure 14:
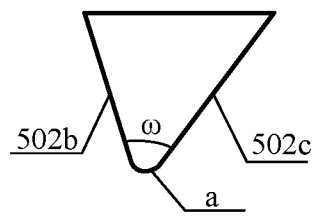
FIG. 14 is a partial enlarged diagram of a first prism in the privacy structure of FIG. 11.

In some specific embodiments, referring to FIG. 14, which is a partial enlarged diagram of a first prism in the privacy structure of FIG. 11, a chamfer exists at a sixth angle @ between the fifth side surface 502b and the sixth side surface 502c in the first prism 502. Moreover, the smaller the radius of the circular arc is, the more accurate control of the viewing angle of the backlight module may be achieved. In some embodiments, the chamfer a is a circular arc with a radius less than or equal to 30 μm. Preferably, the radius of the circular arc is less than or equal to 5 μm. Preferably, the radius of the circular arc is less than or equal to 3 μm. Further preferably, the radius of the circular arc is less than or equal to 1.5 μm. In this way, the light emitted from the second light guide plate 300 can be refracted by the first prism 502 with a high degree of collimation, such that the light exiting from the second light guide plate 300 may be concentrated in the main viewing angle area, which guarantees an excellent privacy effect of the backlight module.

Figure 16:
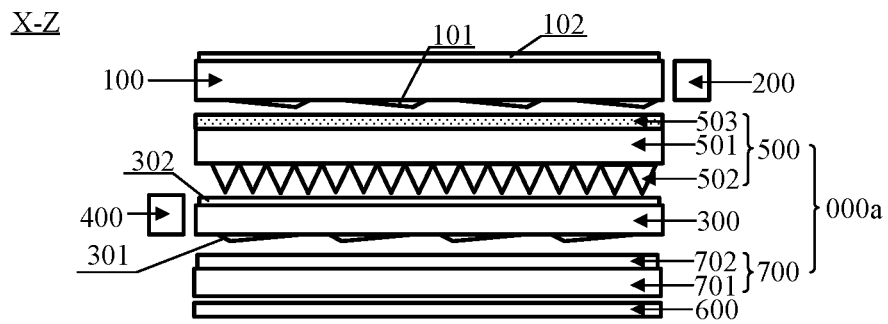
FIG. 16 is yet another schematic structural diagram of the backlight module of FIG. 10 in an X-Z plane according to an embodiment of the present disclosure.

Preferably, as shown in FIG. 16, the privacy structure 500 may further include a particle diffusion layer 503, and the particle diffusion layer 503 may include a transparent film layer and a plurality of particles disposed in the transparent film layer. The particles have scattering property, and the light exiting from the first substrate 501 may be diffused by the scattering particles in the particle diffusion layer 503. In this way, the particle diffusion layer 503 may homogenize the light exiting from the first substrate 501, so as to improve the uniformity of the light exiting from the backlight module, and further improve the display effect of the display apparatus including the backlight module. For example, the particles may include at least one of polymethylmethacrylate, polybutylacrylate, silicone, titanium dioxide and barium sulfate.

In the present disclosure, the structure of the transparent film layer may be implemented in various possible ways, and in the present embodiment, a schematic explanation is made by taking the following two implementation modes as examples.

Figure 15:
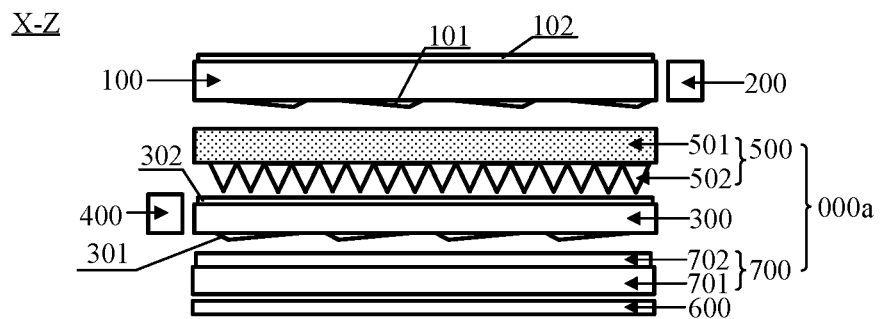
FIG. 15 is another schematic structural diagram of the backlight module of FIG. 10 in an X-Z plane according to an embodiment of the present disclosure.

In the first possible implementation mode, reference is made to FIG. 15, which is another schematic structural diagram of the backlight module of FIG. 10 in an X-Z plane according to an embodiment of the present disclosure, and the transparent film layer is the first substrate 501.

In the second possible implementation mode, as shown in FIG. 16, which is yet another schematic structural diagram of the backlight module of FIG. 10 in an X-Z plane according to an embodiment of the present disclosure, and the transparent film layer is a film layer on a side of the first substrate 501 distal from the plurality of first prisms 502.

Optionally, the concentration of particles in the transparent film layer ranges from 10% to 90%. The concentration range refers to a ratio of the volume of the particles in the transparent film layer to the volume of the transparent film layer.

When the first network 101 and the collimation surface light source 000a are used together, preferably, the first side surface 101a is rectangular. The value range of the width t of the first side surface 101a in the length direction (i.e., the Y direction) of the first network 101 and the value range of the width b of the first side surface 101a in the direction (i.e., the X direction) perpendicular to the length direction of the first network 101 may determine the emitting direction of the light emitted by the first light source 200 and passing through the first light guide plate 100 and the light brightness in each viewing angle area. The width t of the first side surface 101a in the length direction of the first network 101 and the width b of the first side surface 101a in the direction perpendicular to the length direction of the first network 101 may fall within various optional ranges. In the present embodiment, a schematic explanation is made by taking the following three cases as examples.

In the first case, both of the widths t and b of the first side surface 101a may be less than 10 μm or greater than 200 μm. When both of the widths t and b of the first side surface 101a are less than 10 μm or greater than 200 μm, and the backlight module is in the second sharing mode, light emitted by the backlight module will have brightness peaks in the main viewing angle area and two auxiliary viewing angle areas (one area in which an angle ranges from −45° to −60° with the normal direction of the light-exiting surface of the backlight module and the other area in which an angle ranges from 45° to 60° with the normal direction of the light-exiting surface of the backlight module) at two sides of the main viewing angle area.

In the second case, the width t of the first side surface 101a may range from 55 μm to 200 μm, and the width b of the first side surface 101a may range from 65 μm to 200 μm. When the width t of the first side surface 101a ranges from 55 μm to 200 μm, and the width b of the first side surface 101a ranges from 65 μm to 200 μm, and the backlight module is in the second sharing mode, light emitted by the backlight module may have brightness peaks in the main viewing angle area and an auxiliary viewing angle area (one area in which an angle ranges from −45° to −60° with the normal direction of the light-exiting surface of the backlight module) at one side of the main viewing angle area.

In the third case, the width t of the first side surface 101a may range from 10 μm to 55 μm, and the width b of the first side surface 101a may range from 25 μm to 65 μm. When the width t of the first side surface 101a ranges from 10 μm to 55 μm, and the width b of the first side surface 101a ranges from 25 μm to 65 μm, and the backlight module is in the second sharing mode, light emitted by the backlight module may have brightness peaks in the main viewing angle area and an auxiliary viewing angle area (one area in which an angle ranges from −45° to −60° with the normal direction of the light-exiting surface of the backlight module) at one side of the main viewing angle area. Compared with the second case, the third case has the advantage that the light brightness in the auxiliary viewing angle area is higher.

Preferably, as shown in FIG. 11, both of the first light source 200 and the second light source 400 are strip-shaped light sources, and the extending direction of the light source strip of the second light source 400 is the same as that of the light source strip of the first light source 200. Further preferably, the second network 301 is a triangular prism, and the length direction of the second network 301 is parallel to the extending direction of the light source strip of the second light source 400, i.e., as shown in FIG. 11, the length direction of the second network 301 is perpendicular to the X-Z plane. The second network 301 is configured to break a total reflection of the light emitted by the second light source 400 in the second light guide plate 300. In this way, when the backlight module is applied to the CDD system in a vehicle-mounted display system, the backlight module realizes the sharing mode in the horizontal direction of a display surface of the CDD system, and thus, the utilization rate of light is improved. The light-exiting surface of the backlight module is parallel to the display surface of the CDD system and also parallel to the X-Y plane, and the horizontal direction of the light-exiting surface of the backlight module and the display surface of the CDD system is the X direction.

Figure 17:
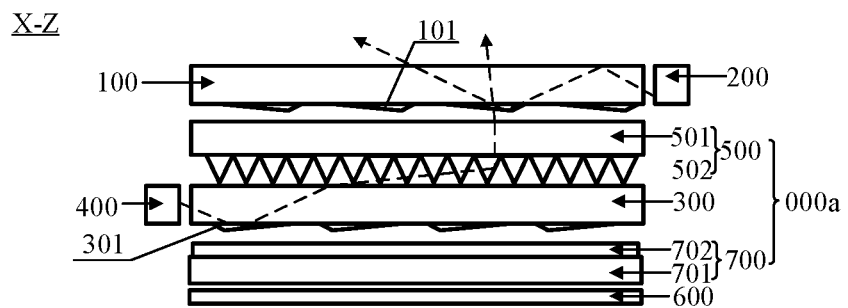
FIG. 17 is a light path diagram of the backlight module of FIG. 11 in a second sharing mode.

When the length direction of the first prism 502 is parallel to the extending direction of the light source strip of the second light source 400, and the value range of the width t of the first side surface 101a in the length direction of the first network 101 and the value range of the width b of the first side surface 101a in the direction perpendicular to the length direction of the first network 101 are in the third case, reference is made to FIG. 17, which is a light path diagram of the backlight module of FIG. 11 in a second sharing mode. After the first light source 200 is turned on, light emitted by the first light source 200 is reflected by the first network 101, and exists from the side of the first light guide plate 100 distal from the first network 101. The light emitted by the first light source 200 is concentrated in the auxiliary viewing angle area in which an angle ranges from −45° to −60° with the normal direction of the light-exiting surface of the backlight module, and there is no light in an auxiliary view area at the other side of the main viewing angle area as much as possible. In this way, when the backlight module is integrated in the CDD system in the vehicle-mounted display system, since the driver is usually at one side of the co-driver, the co-driver views the picture in the main viewing angle area, and the driver views the picture in the auxiliary viewing angle area at one side of the main viewing angle area. Therefore, if there are brightness peaks in the main viewing angle area and the auxiliary viewing angle area at one side of the main viewing angle area but no brightness peak in the auxiliary viewing angle area at the other side of the main viewing angle area, the utilization rate of the light emitted by the backlight module can be effectively improved.

Meanwhile, it can be seen from above that after the second light source 400 is turned on, the light emitted by the second light source 400 is concentrated in the main viewing angle area.

Therefore, when the first light source 300 and the second light source 400 are turned on, the backlight module may be in the second sharing mode. In addition, for the light emitted by the backlight module, there are brightness peaks in the main viewing angle area and the auxiliary viewing angle area at one side of the main viewing angle area, but no brightness peak exists in the auxiliary viewing angle area at the other side of the main viewing angle area. The brightness of the light emitted by the backlight module in the auxiliary viewing angle area may be more than 70% of the brightness in the main viewing angle area, thus improving the brightness of the display apparatus including the backlight module in the auxiliary viewing angle area, and further improving the display effect of the display apparatus in the second sharing mode.

Figure 18:
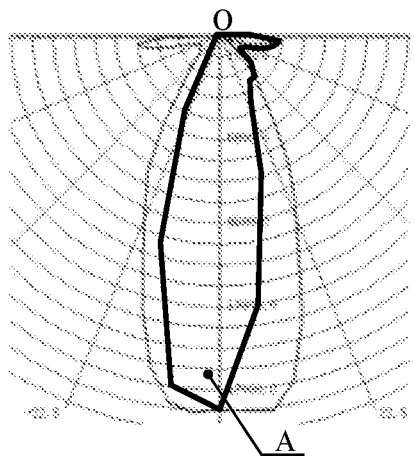
FIG. 18 is a schematic diagram showing light beam distribution of the backlight module of FIG. 11 in a second privacy mode.

Exemplarily, reference is made to FIG. 18, which is a schematic diagram showing light beam distribution of the backlight module of FIG. 11 in a second privacy mode, an origin O is any point in the light-exiting surface of the backlight module, and usually is the center point of the backlight module. Semicircles centered at the origin O represent different brightness, with the unit of cd/m2. Straight lines passing through the origin O represent angles between different viewing directions and the normal line of the light-exiting surface of the backlight module. When the angle is 0°, it means that the viewing direction is perpendicular to the light-exiting surface of the backlight module; when the angle is negative, it means that the viewing direction is on one side (e.g., the left side) of the normal line of the light-exiting surface of the backlight module; and when the angle is positive, it means that the viewing direction is on the other side (e.g., the right side) of the normal line of the light-exiting surface of the backlight module. It should be noted that the thick solid line in FIG. 18 indicates brightness distribution of light beams of the light-exiting surface of the backlight module in the horizontal direction, and the thin solid line indicates brightness distribution of light beams of the light-exiting surface of the backlight module in the vertical direction. When the backlight module is in the second privacy mode, light emitted by the second light source 400 is reflected by the plurality of second networks 301, exits from the side of the second light guide plate 300 distal from the plurality of second networks 301 and is incident onto the privacy structure 500. The first prism 502 in the privacy structure 500 may narrow the light exiting from the second light guide plate 300, such that the light exiting from the second light guide plate 300 is concentrated in a central area A on the light-exiting surface of the backlight module.

Figure 19:
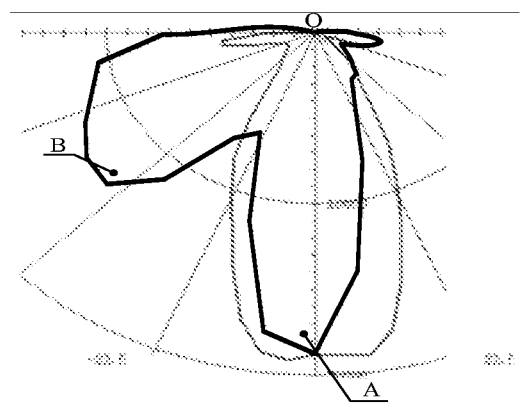
FIG. 19 is a schematic diagram showing light beam distribution of the backlight module of FIG. 11 in a second sharing mode.

As shown in FIG. 19, which is a schematic diagram showing light beam distribution of the backlight module of FIG. 11 in a second sharing mode, a reference may be made to FIG. 18 for the meanings of lines shown in FIG. 19, which will not be repeated herein. When the backlight module is in the second sharing mode, the light emitted by the first light source 200 is reflected by the plurality of first networks 101 and exits from the side of the first light guide plate 100 distal from the plurality of first networks 101. The light emitted by the first light source 200 is concentrated in an area B in which an angle ranges from −45° to −60° with the normal direction of the light-exiting surface of the backlight module. Meanwhile, it can be known from above that after the second light source 400 is turned on, the light emitted by the second light source 400 is concentrated in the central area A. It should be noted that the thick solid line in FIG. 19 indicates the brightness distribution of light beams of the light-exiting surface of the backlight module in the horizontal direction, and the thin solid line indicates the brightness distribution of light beams of the light-exiting surface of the backlight module in the vertical direction.

Figure 20:
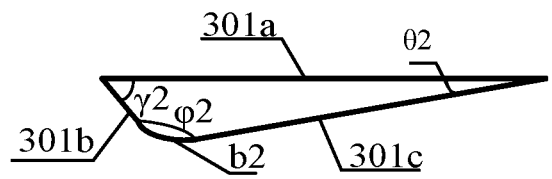
FIG. 20 is a front view of a second network in the backlight module of FIG. 11 in an X-Z plane.
Figure 21:
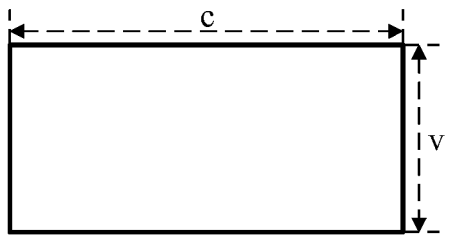
FIG. 21 is a top view of the second network of FIG. 11 in an X-Y plane.

In some specific embodiments, referring to FIGS. 20 and 21, in which FIG. 20 is a front view of the second network 301 in the backlight module of FIG. 11 in an X-Z plane, and FIG. 21 is a top view of the second network 301 of FIG. 11 in an X-Y plane, the second network 301 is of a triangular prism structure and has a seventh side surface 301a in contact with the second light guide plate 300, and an eighth side surface 301b and a ninth side surface 301c which are connected to the seventh side surface 301a. There is a seventh angle θ2 between the seventh side surface 301a and the ninth side surface 301c, an eighth angle γ2 between the seventh side surface 301a and the eighth side surface 301b, and a ninth angle φ2 between the eighth side surface 301b and the ninth side surface 301c. Preferably, the seventh side surface 301a is rectangular. The width of the seventh side surface 301a in a length direction (i.e., the Y direction) of the second network 301 is v and the width of the seventh side surface 301a in a direction (i.e., the X direction) perpendicular to the length direction of the second network 301 is c.

Optionally, the width v of the seventh side surface 301a in the length direction (i.e., the Y direction) of the second network 301 ranges from 35 µm to 100 µm, and the width c of the seventh side surface 301a in the direction (i.e., the X direction) perpendicular to the length direction of the second network 301 ranges from 20 µm to 100 µm. When c and v fall within the above ranges respectively, the brightness and the viewing angle in the second privacy mode may be ideal, and thus guarantees the display effect of the display apparatus. Preferably, the width of the seventh side surface 301a in the length direction (i.e., the Y direction) of the second network 301 ranges from 10 µm to 55 µm, and the width of the seventh side surface 301a in the direction (i.e., the X direction) perpendicular to the length direction of the second network 301 ranges from 40 µm to 55 µm.

Exemplarily, the width of the seventh side surface 301a in the length direction of the second network 301 may be one of 35 µm, 45 µm, 50 µm and 55 µm, and an error range of the width of the seventh side surface 301a in the length direction of the second network 301 is +0.01 µm; the width of the seventh side surface 301a in the direction perpendicular to the length direction of the second network 301 may be one of 45 µm, 45.5 µm, 50 µm, 51.7 µm, 53.5 µm and 55 µm, and an error range of the width of the seventh side surface 301a in the direction perpendicular to the length direction of the second network 301 is +0.02 µm.

Preferably, referring to FIG. 20, the eighth angle γ2 is greater than the seventh angle θ2, and the eighth side surface 301b of the second network 301 is closer to the second light source 400 than the ninth side surface 301c. In this way, the control accuracy of the light emitted by the second light source 400 by the second network 301 may be guaranteed, and the privacy effect of the backlight module may be further ensured.

In the present disclosure, the eighth angle γ2 may range from 10° to 90°, or from 15° to 60°, or from 30° to 60°, or from 40° to 60°, or from 55° to 60°, or from 20° to 45°, or from 25° to 35°, or from 26° to 30°; the fifth angle θ may range from 1° to 30°, or from 1° to 20°, or from 1.5° to 5°, or from 1.5° to 4°, or from 1.5° to 3°. When the backlight module is in the privacy mode, the smaller the eighth angle γ2 is, the lower the light brightness of the backlight module in the main viewing angle area is; and when the backlight module is in the sharing mode, the greater the eighth angle γ2 is, the lower the light brightness of the backlight module in the auxiliary viewing angle area is.

Exemplarily, the eighth angle γ2 may be one of 26.5°, 27.5°, 28.5° and 29.5°, and an error range of the eighth angle γ2 is ±0.5°. In this case, when the backlight module is in the privacy mode and the sharing mode, the brightness of the backlight module in both of the main viewing angle area and the auxiliary viewing angle area is high.

Figure 22:
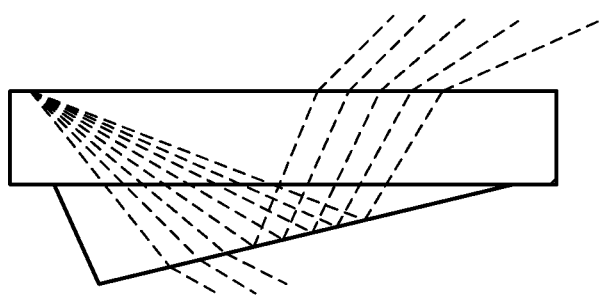
FIG. 22 is a light path diagram of a second light guide plate when a seventh angle θ2 is 20°.
Figure 23:
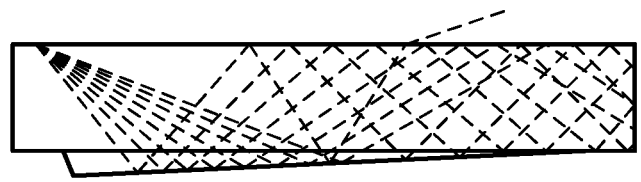
FIG. 23 is a light path diagram of a corresponding second light guide plate when a seventh angle θ2 is less than or equal to 5°.

Referring to FIG. 22 and FIG. 23, in which FIG. 22 is a light path diagram of a second light guide plate when the seventh angle θ2 is 20°, and FIG. 23 is a light path diagram showing an optical path of a corresponding second light guide plate when the seventh angle θ2 is less than or equal to 5°. In the case that both of the size of the second light guide plate 300 and the light emitted by the second light source 400 are the same, when the seventh angle θ2 is 20°, one second network 301 will break the total reflection of the light emitted by the second light source 400 within a wide range in the second light guide plate 300; and when the seventh angle θ2 is less than or equal to 5°, one second network 301 only breaks the total reflection of the light emitted by the second light source 400 within a small range in the second light guide plate 300. That is, the smaller the seventh angle θ2 is, the higher the control accuracy of the light emitted by the second light source 400 by the second network 301 is. Preferably, the seventh angle θ2 is less than or equal to 3.5°. In view of difficulties of the manufacturing process, the seventh angle θ2 ranges from 1.5° to 3.5°.

Exemplarily, the seventh angle θ2 may be one of 1.5°, 2°, 2.5°, 3° and 3.5°, and an error range of the fifth angle θ is ±0.5°. In this way, the control accuracy of the light emitted by the second light source 400 by the second network 301 is high, and thus guarantees the privacy effect of the backlight module.

In some embodiments of the present disclosure, referring to FIG. 20, a chamfer b2 exists at the ninth angle φ2 between the eighth side surface 301b and the ninth side surface 301c in the second network 301. In some embodiments, the chamfer b2 is a circular arc. In order to ensure an excellent privacy effect when the backlight module is in the privacy mode, the radius of the circular arc should be less than or equal to 30 µm. Preferably, when the radius of the circular arc is not more than 10 µm, the backlight module is in the sharing mode and the light brightness in the main viewing angle area and the auxiliary viewing angle area is higher. Further preferably, the radius of the circular arc is less than or equal to 5 µm, such that when the backlight module is in the privacy mode and the sharing mode, the light brightness in both of the main viewing angle area and the auxiliary viewing angle area is higher. More preferably, the radius of the circular arc may be less than or equal to 3 µm. Therefore, the light brightness in the main viewing angle area and the auxiliary viewing angle area can be further improved when the backlight module is in the privacy mode and the sharing mode.

In some optional embodiments, the second network 301 may also be of a rectangular pyramid structure.

In some optional embodiments, the seventh side surface 301a may be of other shapes than a rectangle. In this case, a maximum width v0 of the seventh side surface 301a in the length direction (i.e., the Y direction) of the second network 301 is defined as the width of the seventh side surface 301a in the length direction of the second network 301. Optionally, v0 ranges from 35 µm to 100 µm. A maximum width c0 of the seventh side surface 301a in a direction perpendicular to the length direction of the second network 301 is defined as the width of the seventh side surface 301a in the direction perpendicular to the length direction of the second network 301. Optionally, c0 ranges from 20 µm to 100 µm.

In some specific embodiments of the present disclosure, the first network 101 and the second network 301 may be of the same shape and size, i.e., the first network 101 and the second network 301 may be of the same size and angle.

In some specific embodiments of the present disclosure, the first network 101 and the second network 301 may be of the same or opposite orientations.

Preferably, the density of the first networks 101 in any position of the first light guide plate 100 is positively correlated with the distance between the first light source 200 and the position, i.e., the density of the first networks 101 in any position of the first light guide plate 100 tends to increase as the distance between the first light source 200 and the position increases. Similarly, the density of the second networks 301 in any position of the second light guide plate 300 is positively correlated with the distance between the second light source 400 and the position. In this way, uniform transmission of light in the first light guide plate 100 and the second light guide plate 300 can be guaranteed and thus the uniformity of the brightness of the backlight module is improved.

Optionally, the material of the first light guide plate 100 and the second light guide plate 300 may include: polymethylmethacrylate (PMMA), PC, PET or a light-curing material, with the refractive index ranging from 1.3 to 1.65. For example, the material of the first light guide plate 100 and the second light guide plate 300 includes PC, the refractive index of which ranges from 1.58 to 1.59. The first network 101 and the second network 301 may be manufactured by means of injection molding or hot pressing. The thicknesses of the first light guide plate 100 and the second light guide plate 300 may be determined by the size of the display apparatus including the backlight module. For example, when the display apparatus including the backlight module is a mobile phone, both the thicknesses of the first light guide plate 100 and the second light guide plate 300 range from 300 µm to 500 µm, e.g., the thicknesses of the first light guide plate 100 and the second light guide plate 300 may be 400 µm or 500 µm. When the display apparatus including the backlight module is a CDD system, both the thicknesses of the first light guide plate 100 and the second light guide plate 300 range from 1,800 µm to 2,100 µm, e.g., both the thicknesses of the first light guide plate 100 and the second light guide plate 300 may be 2,000 µm.

It should be noted that the material of first light guide plate 100 and the material of the second light guide plate 300 may be the same or different materials.

In some specific embodiments of the present disclosure, a first combination of the first network 101 and the first light guide plate 100 may be exactly the same as a second combination of the second network 301 and the second light guide plate 300, such that the first combination and the second combination can be manufactured by one time of development process, which reduces both the development cost and the process complexity.

Figure 24:
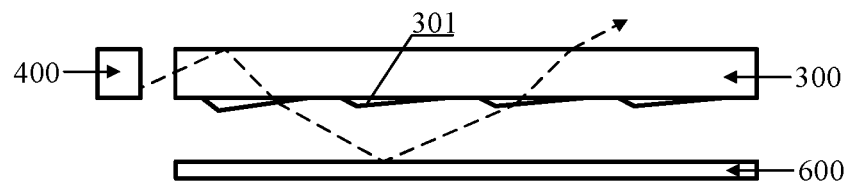
FIG. 24 is a light path diagram of a reflector in the backlight module of FIG. 11.

In an embodiment of the present disclosure, referring to FIG. 11, the collimation surface light source 000 may further include a reflector 600 on a side of the second light guide plate 400 distal from the privacy structure 500. As shown in FIG. 24, which is a light path diagram of a reflector in the backlight module of FIG. 11, the reflector 600 may be configured to reflect again the light transmitted from the second network 301 back to the second light guide plate 300, which improves the utilization rate of the light and increase the brightness of the light emitted by the backlight module in the privacy mode.

Optionally, the reflector 600 is a specular reflector. For example, the reflector 600 may be a silver reflector or an enhanced specular reflector (ESR). In this way, the reflector 600 may reflect light transmitted from the first network 101 back to the second light guide plate 300 in the form of specular reflection, thereby preventing the light emitted by the second light source 400 from being scattered and guaranteeing the privacy effect of the backlight module.

In the present disclosure, referring to FIG. 11, the collimation surface light source 000 may further include a prism layer 700 disposed between the second light guide plate 300 and the reflector 600. The prism layer 700 may include a second substrate 701, and a plurality of strip-shaped second prisms 702 on the second substrate 701. The second prisms 702 are on a side of the second substrate 701 proximal to the second light guide plate 300, and length directions of the second prisms 702 are perpendicular to the extending direction of the light source strip of the second light source 300. The length directions of the second prisms 702 are parallel to the X-Z plane, and the plurality of second prisms 702 are closely arranged on the second substrate 702, i.e., there is no gap between any two adjacent second prisms 702. In this way, the second prisms 702 can narrow light beams of the light-exiting surface of the backlight module in the vertical direction to improve the overall brightness of the backlight module.

It should be noted that a side of the second substrate 701 distal from the second prisms 702 may be a reflective surface. For example, a side of the second substrate 701 distal from the second prisms 702 may be coated with a reflective material. Therefore, there is no need to provide the backlight module with the reflector 600, which simplifies the film structure of the backlight module.

Preferably, the second prism 702 has a tenth side surface in contact with the second substrate 701, and an eleventh side surface and a twelfth side surface which are connected to the tenth side surface. A tenth angle between the tenth side surface and the eleventh side surface equals an eleventh angle between the tenth side surface and the twelfth side surface, and a twelfth angle between the eleventh side surface and the twelfth side surface is 90°, i.e., the cross section of the second prism 702 in the Y-Z plane is an isosceles right triangle.

Figure 25:
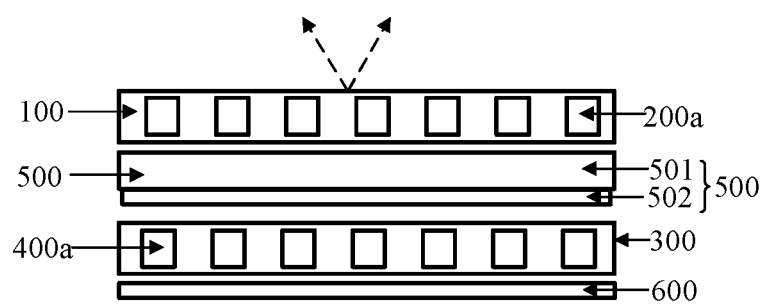
FIG. 25 is a schematic diagram showing a backlight module not including a prism layer viewed in a Y-Z plane according to an embodiment of the present disclosure.
Figure 26:
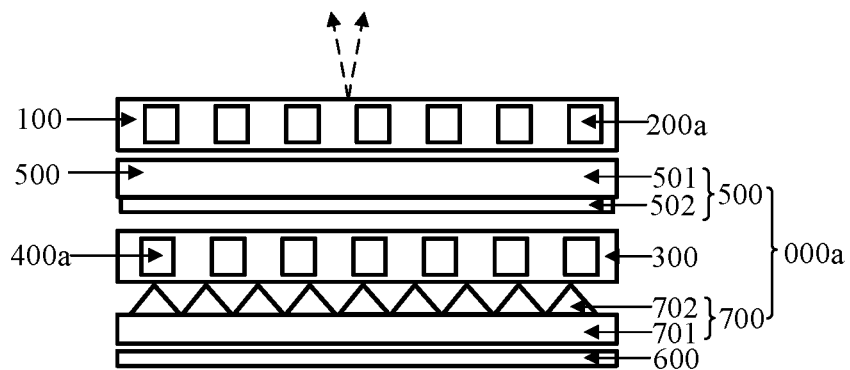
FIG. 26 is a light path diagram of the backlight module of FIG. 11 in a Y-Z plane.

Exemplarily, reference is made to FIGS. 25 and 26, in which FIG. 25 is a light path diagram of a backlight module not including a prism layer in a Y-Z plane according to an embodiment of the present disclosure, and FIG. 26 is a light path diagram of the backlight module of FIG. 11 in a Y-Z plane. Compared with FIG. 25, the light beams of the light-exiting surface of the backlight module as shown in FIG. 26 in the vertical direction are narrowed, the brightness peak is obviously improved, and thus the overall brightness of the backlight module can be increased by 20% to 30%.

Figure 27:
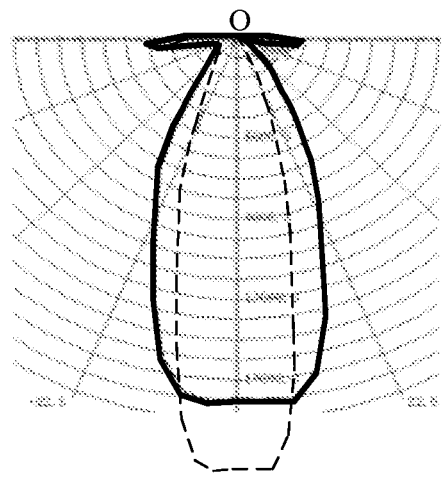
FIG. 27 is a schematic diagram showing light beam distribution of a backlight module in a vertical direction of a light-exiting surface of the backlight module according to an embodiment of the present disclosure.

Exemplarily, reference is made to FIG. 27, which is a schematic diagram showing light beam distribution of a backlight module in a vertical direction of a light-exiting surface of the backlight module according to an embodiment of the present disclosure. Except for the meaning indicated by the thickness of the lines, a reference may be made to FIG. 18 for the meaning of FIG. 27, which will not be repeated herein. In FIG. 27, the thick solid line indicates light beam distribution in the vertical direction of the light-exiting surface of the backlight module not including the second prism 702, and the thin dashed line indicates light beam distribution in the vertical direction of the light-exiting surface of the backlight module including the second prism 702. It can be seen from FIG. 27 that for the backlight module including the second prism 702, the light beams in the vertical direction of the light-exiting surface of the backlight module are narrowed and the brightness is increased.

Figure 28:
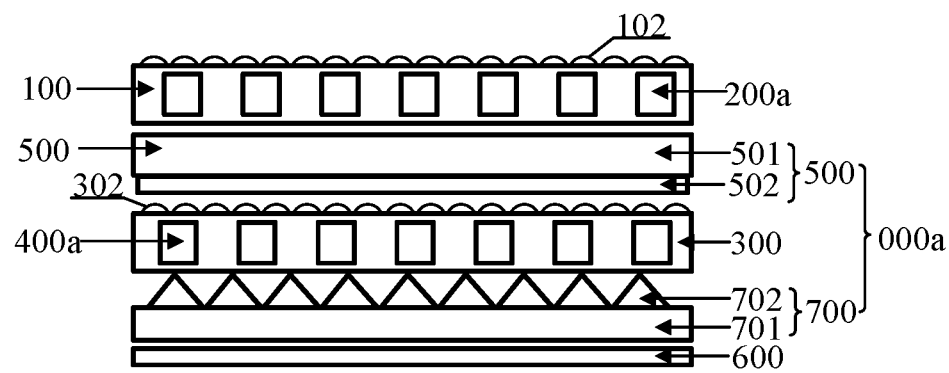
FIG. 28 is a schematic structural diagram of another backlight module in a Y-Z plane according to an embodiment of the present disclosure.

In an embodiment of the present disclosure, reference is made to FIG. 28, which is a schematic structural diagram of another backlight module in a Y-Z plane according to an embodiment of the present disclosure. There may be a plurality of strip-shaped third prisms 102 on the side of the first light guide plate 100 distal from the plurality of first networks 101, there are a plurality of strip-shaped fourth prisms 302 on the side of the second light guide plate 300 distal from the second networks 301, and length directions the plurality of third prisms 102 and length directions of the plurality of fourth prisms 302 are all parallel to those of the second prisms 702. The plurality of third prisms 102 may be in a close arrangement on the first light guide plate 100, and the close arrangement means that there is no gap between any two adjacent third prisms 102. The fourth prisms 302 may be in a close arrangement on the first light guide plate 300, and the close arrangement means that there is no gap between any two adjacent fourth prisms 302.

In the present disclosure, the shapes and the structures of the third prism 102 and the fourth prism 302 may be implemented in a number of possible ways, and in the present embodiment, a schematic explanation is made by taking the following two possible ways as examples.

In the first possible implementation mode, the shapes and the structures of the third prism 102 and the fourth prism 302 are the same as those of the second prism 702, and thus will not be repeated herein.

In the second possible implementation mode, referring to FIG. 28, the cross sections of the third prism 102 and the fourth prism 302 in the Y-Z plane are arched.

It should be noted that in other optional implementation modes, the cross sections of the third prism 102 and the fourth prism 302 may also be trapezoidal, which will not be limited in the embodiments of the present disclosure.

Therefore, the third prism 102 and the fourth prism 302 may also narrow the light beam in the vertical direction of the light-exiting surface of the backlight module, which further increases the overall brightness of the backlight module.

It should be noted that the backlight module may narrow the light beam in the vertical direction of the light-exiting surface of the backlight module so long as the backlight module is provided with at least one of the third prism 102 on the first light guide plate 100 and the fourth prism 302 on the second light guide plate 200 and the prism layer 700.

Figure 29:
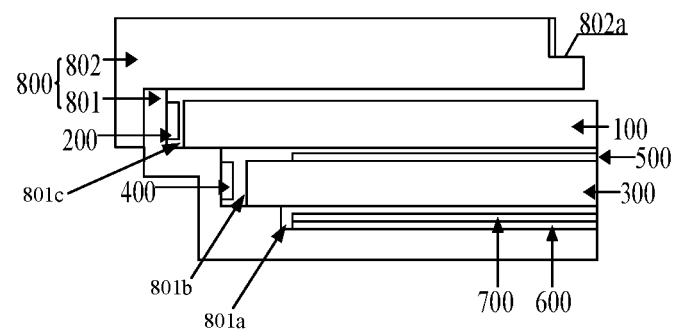
FIG. 29 is a schematic structural diagram of yet another backlight module according to an embodiment of the present disclosure.

In the present disclosure, reference is made to FIG. 29, which is a schematic structural diagram of yet another backlight module according to an embodiment of the present disclosure. The backlight module may further include a frame 800. The first light guide plate 100, the second light guide plate 300, the privacy structure 500, the first light source 200 and the second light source 400 in the backlight module are all disposed in the frame 800.

Optionally, as shown in FIG. 29, the frame 800 may include a back plate 801, the back plate 801 is provided with a first groove 801a, a second groove 801b and a third groove 801c that are sequentially communicated, an opening surface of the first groove 801a is coplanar with a bottom surface of the second groove 801b, and an opening surface of the second groove 801b is coplanar with a bottom surface of the third groove 801c. The reflector 600 is disposed in the first groove 801a, both of the second light guide plate 300 and the second light source 400 are disposed in the second groove 801b, both of the first light guide plate 100 and the first light source 200 are disposed in the third groove 801c, and the privacy structure 500 is also disposed in the second groove 801b. The back plate 801 can effectively support each film layer structure in the backlight module.

At the same time, the reflector 600 is disposed in the first groove 801a, both of the second light guide plate 300 and the second light source 400 are disposed in the second groove 801b, and both of the first light guide plate 100 and the first light source 200 are disposed in the third groove 801c. A certain distance between the first light guide plate 100 and the reflector 600 and/or a certain distance between the second light guide plate 300 and the privacy structure 500 may be selectively provided to avoid damages caused by interaction between the first network 101 in the first light guide plate 100 and the surface of the reflector 600 and/or the second network 301 in the second light guide plate 300 and the surface of the privacy structure 500. Therefore, the display effect of the display apparatus including the backlight module will not be adversely affected.

It should be noted that since the distance between the first light guide plate 100 and the reflector 600, as well as the distance between the second light guide plate 300 and the privacy structure 500, is positively correlated with the attenuation degree of the overall brightness of the backlight module, the distance between the first light guide plate 100 and the reflector 600, as well as the distance between the second light guide plate 300 and the privacy structure 500, should not be too large as so to ensure the high overall brightness of the backlight module.

Optionally, both of the distance between the first light guide plate 100 and the reflector 600 and the distance between the second light guide plate 300 and the privacy structure 500 may be not less than 0.1 mm and not more than 0.5 mm.

It should be noted that a ring-shaped support structure may be provided between the privacy structure 500 and the second light guide plate 300, such that there is a certain distance between the privacy structure 500 and the second light guide plate 300, and damages caused by the interaction between the first prism 502 in the privacy structure 500 and the surface of the second light guide plate 300 can be avoided. The distance may range from 0.1 mm to 0.5 mm.

In the present disclosure, the frame 800 may further include a plastic frame 802 connected to an edge of the back plate 801, and the plastic frame 802 is provided with a panel bearing portion 802a for bearing a display panel.

In an embodiment of the present disclosure, the positional relationships between the first light source 200 and the second light source 400 in the frame 800 may be implemented in various possible implementation modes. In the present embodiment, a schematic explanation may be made by taking the following two possible implementation modes as examples.

In the first possible implementation mode, as shown in FIG. 29, the first light source 200 and the second light source 400 are on the same side of the frame 800. Therefore, the width of a border of the backlight module can be reduced.

Figure 30:
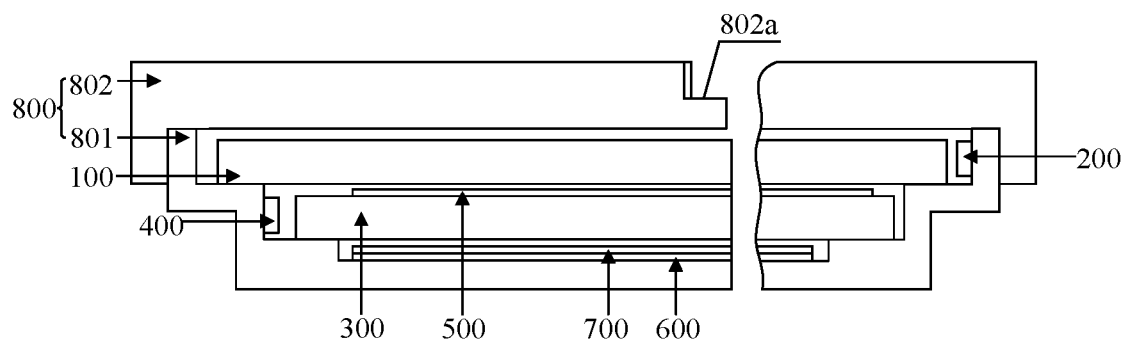
FIG. 30 is a schematic structural diagram of still another backlight module according to an embodiment of the present disclosure.

In the second possible implementation mode, as shown in FIG. 30, which is a schematic structural diagram of still another backlight module according to an embodiment of the present disclosure, the first light source 200 and the second light source 400 are on two opposite sides of the frame 800 respectively. Therefore, heat dissipation of the backlight module in the working process is facilitated.

In summary, the backlight module provided by the embodiment of the present disclosure includes the collimation surface light source, the first light guide plate and the first light source. In the backlight module, since the first light guide plate is on the light-exiting side of the surface light source, light emitted by the first light source may exit from the backlight module only after being reflected by the first network, without passing through other film layers. Therefore, loss of the light emitted by the first light source is reduced in the transmitting process, and the light brightness in the auxiliary viewing angle area is improved when the backlight module is in the sharing mode. Further, when the display apparatus including the backlight module is in the sharing mode, the brightness of a display picture and the display effect of the display apparatus are improved.

Figure 31:
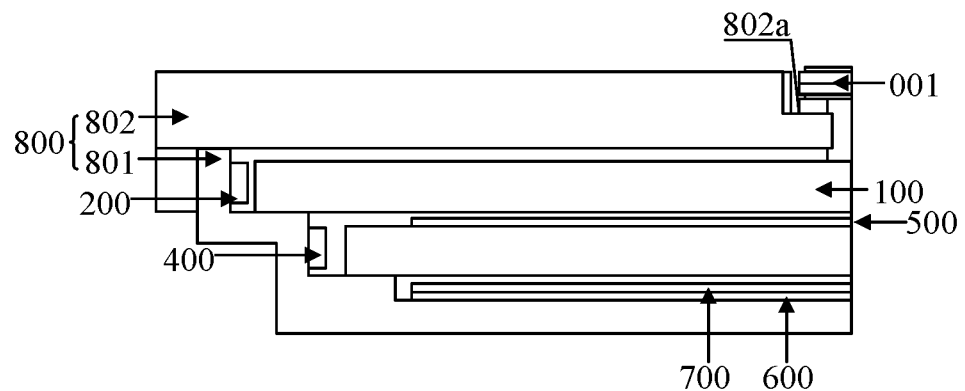
FIG. 31 is a schematic structural diagram of a display apparatus according to an embodiment of the present disclosure.

An embodiment of the present disclosure further provides a display apparatus, which may include a display panel and the backlight module described above. For example, as shown in FIG. 31, which is a schematic structural diagram of a display apparatus according to an embodiment of the present disclosure, the display apparatus includes any one of the backlight modules described above and a display panel 001, the display panel 001 is on a panel bearing portion 802a in the backlight module. Optionally, the display panel 001 may be connected to the backlight module by foam 002.

The display panel 001 is an LCD panel and may include an array substrate and a color film substrate opposite to each other, as well as a first polarizer on a side of the array substrate distal from the color film substrate and a second polarizer on a side of the color film substrate distal from the array substrate.

The display apparatus may be any product or component having a display function, such as an LCD panel, electronic paper, a mobile phone, a tablet computer, a television, a monitor, a notebook computer, a digital photo frame, a navigator or a CDD system in a vehicle-mounted display system.

It can be understood that a usage scenario of the display apparatus is not limited to the CDD system in the vehicle-mounted display system.

It should be noted that in the drawings, the dimensions of the layers and areas may be exaggerated for the clarity of the drawings. It can be understood that when an element or layer is named to be disposed "on" another element or layer, the element or layer may be directly on the another element, or there may be an intermediate layer. Further, it can be understood that when an element or layer is named to be disposed "under" another element or layer, the element or layer may be directly disposed under the another element, or there may be at least one intermediate layer or element. Further, it can be understood that when an element or layer is named to be disposed "between" two layers or two elements, the element or layer may be the exclusive one between the two layers or two elements, or there may be at least one intermediate layer or element. Similar reference signs refer to similar elements throughout the whole text.

In the present disclosure, the descriptions of the term "range" in the above embodiments shall include endpoint values. For example, in the term "ranges from 45° to 90°", the range includes the endpoint values 45° and the endpoint value 90°.

In the present disclosure, the terms "first" and "second" are only for the purpose of description and should not be construed as indicating or implying relative importance, and the term "a plurality of" means two or more, unless otherwise explicitly limited.

The foregoing descriptions are merely optional embodiments of the present disclosure, and are not intended to limit the present disclosure. Within the spirit and principles of the present disclosure, any modifications, equivalent substitutions, improvements, etc., should fall within the protection scope of the present disclosure.

What is claimed is:

1. A backlight module, comprising:
a surface light source;
a first light guide plate laminated with the surface light source in a thickness direction, wherein the first light guide plate is on a light-exiting side of the surface light source, and a side of the first light guide plate proximal to the surface light source comprises a plurality of first prism structures; and
a first light source on a side surface of the first light guide plate, wherein an orthographic projection of the first light source onto a plane, where a light-exiting surface of the surface light source is located, does not overlap with that of the first light guide plate onto the plane;
wherein the surface light source is a collimation surface light source, the collimation surface light source comprises a privacy structure and a second light guide plate that are laminated in the thickness direction;
the second light guide plate is on a side of the privacy structure distal from the first light guide plate, and a side of the second light guide plate distal from the privacy structure comprises a plurality of second prism structures; and
the collimation surface light source further comprises a second light source on a side surface of the second light guide plate, and an orthographic projection of the second light source onto a plane, where a light-exiting surface of the collimation surface light source is located, does not overlap with that of the second light guide plate onto the plane.

2. The backlight module according to claim 1, wherein
the first light source is a strip-shaped light source;
the first prism structure is of a prism structure, and a length direction of the first prism structure is parallel to an extending direction of a light source strip of the first light source; and
the first prism structure is of a triangular prism structure; the first prism structure comprises a first side surface in contact with the first light guide plate, and a second side surface and a third side surface which are connected to the first side surface; a first angle exists between the first side surface and the second side surface; a second angle exists between the first side surface and the third side surface; and a third angle exists between the second side surface and the third side surface.

3. The backlight module according to claim 2, wherein a width of the first side surface in the length direction of the first prism structure ranges from 35 μm to 100 μm, and a width of the first side surface in a direction perpendicular to the length direction of the first prism structure ranges from 20 μm to 100 μm.

4. The backlight module according to claim 2, wherein the first angle ranges from 20° to 70°, and the second angle is less than or equal to 20°.

5. The backlight module according to claim 1, wherein
the privacy structure comprises a first substrate, and a plurality of strip-shaped first prisms on the first substrate, and the plurality of first prisms are on a side of the first substrate proximal to the second light guide plate; and
the second light source is a strip-shaped light source, and an extending direction of a light source strip of the second light source is the same as that of the light source strip of the first light source; and
length directions of the plurality of first prisms are parallel to the extending direction of the light source strip of the second light source.

6. The backlight module according to claim 5, wherein
the first prism is of a triangular prism structure, and comprises a fourth side surface in contact with the first substrate, and a fifth side surface and a sixth side surface which are connected to the fourth side surface; and
a fourth angle between the fourth side surface and the fifth side surface is greater than or equal to a fifth angle between the fourth side surface and the sixth side surface, and the fourth side surface of the first prism is closer to the second light source than the fifth side surface.

7. The backlight module according to claim 6, wherein the fourth angle ranges from 45° to 90°, and the fifth angle ranges from 45° to 70°.

8. The backlight module according to claim 6, wherein the fourth angle ranges from 60° to 72°, and the fifth angle ranges from 53° to 57°.

9. The backlight module according to claim 5, wherein
the second prism structure is of a triangular prism structure, and a length direction of the second prism structure is parallel to the extending direction of the light source strip of the second light source;
the second prism structure comprises a seventh side surface in contact with the second light guide plate, and an eighth side surface and a ninth side surface which are connected to the seventh side surface; and
a seventh angle exists between the seventh side surface and the eighth side surface, an eighth angle exists between the seventh side surface and the ninth side surface, and a ninth angle exists between the eighth side surface and the ninth side surface.

10. The backlight module according to claim 9, wherein a width of the seventh side surface in the length direction of the second prism structure ranges from 35 μm to 100 μm, and a width of the seventh side surface in a direction perpendicular to the length direction of the second prism structure ranges from 20 μm to 100 μm.

11. The backlight module according to claim 9, wherein the seventh angle is greater than the eighth angle, and the eighth side surface of the second prism structure is closer to the second light source than the ninth side surface.

12. The backlight module according to claim 11, wherein the seventh angle ranges from 10° to 90°, and the eighth angle is less than or equal to 30°.

13. The backlight module according to claim 12, wherein the seventh angle ranges from 26° to 30°, and the eighth angle is less than or equal to 5°.

14. The backlight module according to claim 9, wherein a chamfer exists at the ninth angle between the eighth side surface and the ninth side surface, and the chamfer is a circular arc with a radius less than or equal to 30 μm.

15. The backlight module according to claim 14, wherein the radius of the circular arc is less than or equal to 5 μm.

16. The backlight module according to claim 1, wherein
the collimation surface light source further comprises a reflector on a side of the second light guide plate distal from the privacy structure; and
the collimation surface light source further comprises a second substrate between the second light guide plate and the reflector, and a plurality of strip-shaped second prisms on the second substrate, the second prisms are on a side of the second substrate proximal to the second light guide plate, and length directions of the plurality of second prisms are perpendicular to the extending direction of the light source strip of the second light source.

17. The backlight module according to claim 1, wherein
the collimation surface light source further comprises a reflector on a side of the second light guide plate distal from the privacy structure; and
a side of the first light guide plate distal from the plurality of first prism structures comprises a plurality of strip-shaped third prisms, and/or a side of the second light guide plate distal from the plurality of second prism structures comprises a plurality of strip-shaped fourth prisms; and
length directions of the plurality of third prisms and length directions of the plurality of fourth prisms are perpendicular to the extending direction of the light source strip of the second light source.

18. A display apparatus, comprising:
a display panel, and the backlight module according to claim 1.

19. The display apparatus according to claim 18, wherein the privacy structure comprises a first substrate, and a plurality of strip-shaped first prisms on the first substrate, and the plurality of first prisms are on a side of the first substrate proximal to the second light guide plate; and
the second light source is a strip-shaped light source, and an extending direction of a light source strip of the second light source is the same as that of the light source strip of the first light source; and
length directions of the plurality of first prisms are parallel to the extending direction of the light source strip of the second light source.

20. The display apparatus according to claim 19, wherein the first prism is of a triangular prism structure, and comprises a fourth side surface in contact with the first substrate, and a fifth side surface and a sixth side surface which are connected to the fourth side surface; and
a fourth angle between the fourth side surface and the fifth side surface is greater than or equal to a fifth angle between the fourth side surface and the sixth side surface, and the fourth side surface of the first prism is closer to the second light source than the fifth side surface.

* * * * *